United States Patent [19]

Ayla et al.

[11] Patent Number: 4,587,285

[45] Date of Patent: May 6, 1986

[54] AQUEOUS HEAT-CURABLE COMPOSITIONS, AND THEIR USE

[75] Inventors: Cihan Ayla, Hamburg, Fed. Rep. of Germany; Hans-Hermann Dietrichs, deceased, late of Reinbek, Fed. Rep. of Germany, by Magda M. U. Dietrichs, Daniel Dietrichs, Stephan Dietrichs, heirs; Jürgen Puls, Reinbek; Michael Sinner, Mainz, both of Fed. Rep. of Germany

[73] Assignee: Fritz-Werner Industrie-Ausruestungen GmbH, Geisenheim, Fed. Rep. of Germany

[21] Appl. No.: 482,789

[22] Filed: Apr. 7, 1983

[30] Foreign Application Priority Data

Apr. 8, 1982 [DE] Fed. Rep. of Germany ....... 3213159

[51] Int. Cl.⁴ .......................... C08L 61/00; C08L 1/02
[52] U.S. Cl. ........................................ 524/78; 524/14; 156/328; 428/529
[58] Field of Search ............... 527/100, 103, 105, 300, 527/303, 312; 524/13, 14, 15, 16, 78; 528/1; 106/123 LC; 260/124; 428/528, 529; 156/328, 336

[56] References Cited

U.S. PATENT DOCUMENTS

| | | | |
|---|---|---|---|
| 1,959,433 | 5/1934 | Loetscher | 527/303 |
| 2,366,425 | 1/1945 | Ringer | 527/100 |
| 2,782,241 | 2/1957 | Gray et al. | 528/1 |
| 2,868,743 | 1/1959 | Feigley, Jr. | 524/58 |
| 3,025,250 | 3/1962 | Herrick et al. | 527/100 |
| 3,405,053 | 10/1968 | Broadhead et al. | 527/105 |
| 3,985,728 | 10/1976 | Lin | 536/120 |
| 4,009,073 | 2/1977 | Pozzo et al. | 162/132 |
| 4,098,765 | 7/1978 | Kays et al. | 528/1 |
| 4,175,148 | 11/1979 | Luck et al. | 428/171 |
| 4,311,621 | 1/1982 | Nishizawa et al. | 524/13 |
| 4,433,126 | 2/1984 | Hsu et al. | 527/105 |

Primary Examiner—Morton Foelak
Assistant Examiner—Nathan M. Nutter
Attorney, Agent, or Firm—Schwartz, Jeffery, Schwaab, Mack, Blumenthal & Evans

[57] ABSTRACT

Aqueous heat-curable compositions which are based on known heat-curable condensation products of aldehydes and OH- and/or $NH_2$-containing compounds, which contain hemicellulose-cleavage products having an average degree of polymerization, DP, of 5 to 100 and of at least 10% by weight, relative to the total weight of heat-curable materials, and aldehydes, in an amount of 5 to 50% by weight, relative to the weight of hemicellulose-cleavage products. The invention also relates to the use of these compositions for glueing and for preparing moldings.

19 Claims, 1 Drawing Figure

ELUTION VOLUME

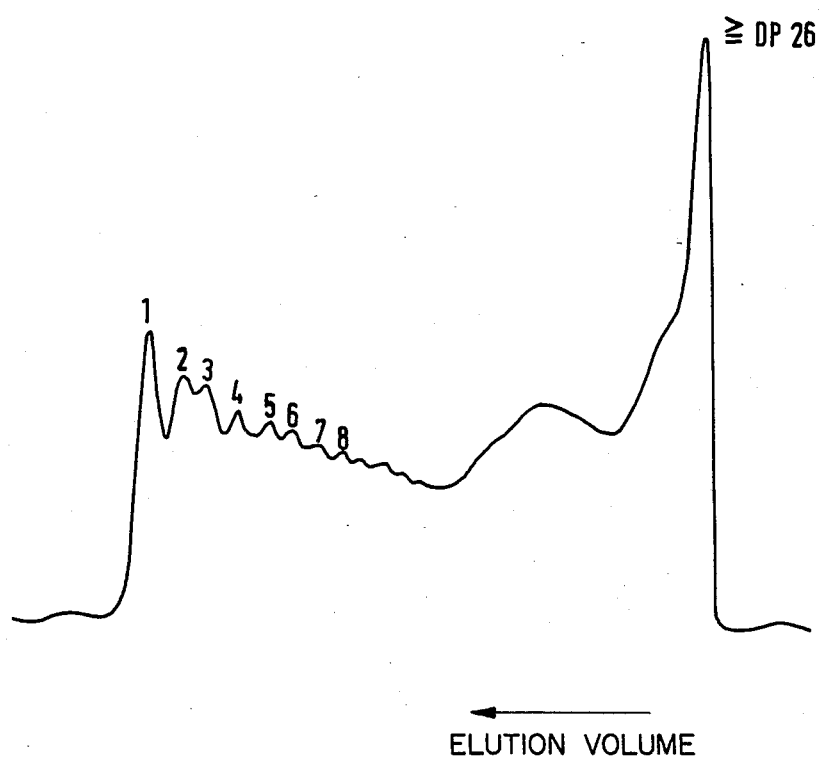

AQUEOUS HEAT-CURABLE COMPOSITIONS, AND THEIR USE

BACKGROUND OF THE INVENTION

The present invention relates to aqueous heat-curable compositions which are based on known heat-curable condensation products of aldehydes and hydroxy- and/or amine containing compounds. The invention also relates to the use of such compositions as glues, as impregnating materials for cellulosic webs and for preparing moldings.

Curable condensation products of aldehydes and hydroxy-and/or amine containing compounds are of great industrial importance. They are precondensates which may contain various additives and which are used for various purposes, in particular as glues and as impregnating materials for cellulosic webs which are then turned into surface coatings. The condensation products are preferably phenol-, resorcinol-, urea- or melamine-formaldehyde resins. They are generally used in the form of aqueous solutions or emulsions. When these aqueous solutions or emulsions are used as glues, the water is absorbed by the somewhat absorbent materials to be bonded to each other.

When used as impregnating agents, curing is generally preceded by drying. The curing is effected at elevated temperatures. Depending on the intended use, the condensation products could contain catalysts, for example alkalis, acids, metal salts, plasticizers, surface-active substances and film-forming substances, for example polyvinyl alcohol or polyvinyl acetate.

Possible fillers are coconut shell powder, bark powder, walnut shell powder, stone powders, chalk, wood flour or other customary fillers.

Possible extenders are blood albumin, rye, wheat, bean or potato flours, or other customary extenders.

The addition of these agents reduces the consumption of the actual glue resins, improves the flow properties of glue line and holds back the glue resin in the glued joint. Excessively high additions of the agents reduce the water resistance of glued joints.

It is also known that starches which have been cooked, for example treated with alkali under heat, or additionally modified starches produce, on admixture of durosetting plastics, starches which combine substantial joint strength with substantial water resistance. For instance, British Pat. No. 527,704 describes the preparation, from melamine-aldehyde condensation products and starch conversion products, of glues which are water-soluble or which, stirred with cold water, give a paste. Hot-pressed test specimens of glues containing 70–89% of modified starch and 20% of plastic had very strong and water-resistant glued joints.

On increasing the modified starch content to 90–95% and, correspondingly, reducing the plastic content to 10–5% the glued joints were found to be still stronger: loading did not break the glued joint but the wood. However, the water-resistance of these samples was lower.

According to U.S. Pat. No. 2,275,314, cooked starches, for example—predominantly cassava flour which has been cooked in an alkaline medium—are added in preferred amounts of 40–60% of urea-formaldehyde condensates. On hot-pressing, the resulting glues displayed equal or improved dry strengths and, usually, significantly improved wet strengths compared with starch and casein glues of the type used for glueing wood.

By reacting sucrose with phenol and formaldehyde in alkaline solution, it is possible to obtain boilproof phenolic resins in which about half the phenol is replaced by sucrose (C. D. Chang and O. K. Kononenko, Adhesives Age, 1962, 36–40).

In Canadian Pat. No. 1,090,026, phenol, urea and carbohydrates, such as dextrin or starch, are condensed under acid conditions. The resulting products were processed together with commercially available fillers and curing agents into compression-molding compositions which satisfy the requirements of ASTM D570-63 (6a). the condensates were also further condensed with formaldehyde under alkaline conditions to give resols which gave boil-proof glueings.

SUMMARY OF THE INVENTION

The compositions defined above have excellent properties as regards adhesive strength, and they form hard surfaces when used as coating agents. Technically and economically they are relatively valuable products. There is therefore a need to provide compositions which are based on known condensation products and which, in addition, contain other curable materials which are very readily available and are physiologically acceptable and which have no, or only a very insignificant adverse effect on the other properties of the condensation products mentioned. It is an object of the present invention to provide such materials.

We have found, surprisingly, that this object is achieved when the compositions contain certain hemicellulose-cleavage products.

The present invention accordingly relates to aqueous heat-curable compositions which are based on known heat-curable condensation products of aldehydes and —OH and/or —NH$_2$ containing compounds, which contain hemicellulose-cleavage products having an average degree of polymerization, DP, of 5 to 100 in an amount of at least 10% by weight, relative to the total weight of heat-curable materials, and aldehydes in an amount of 5 to 50% by weight, relative to the weight of the hemicellulose-cleavage products.

BRIEF DESCRIPTION OF THE DRAWING

FIG. 1 is a gel chromatogram showing chain length distribution of extracted xylans.

DETAILED DESCRIPTION OF PREFERRED EMBODIMENTS

For the purposes of the invention, the known products defined above can be used as curable condensation products.

It is also possible to use existing catalysts, fillers, extenders and the like.

As already stated, the compositions of the invention contained at least 10% by weight, relative to the total weight of heat-curable materials, of the hemicellulose-cleavage products defined above. The upper limit is determined by the desired adhesive strength of the compositions. The upper limit can vary with the natural origin of the hemicellulose-cleavage products, i.e. with the natural origin of the vegetable raw materials from which the hemicellulose-cleavage products are obtained. It is in some cases 90% by weight. However, in other cases it can be slightly lower. The upper limit can be readily determined in a particular case by means of simple mixtures whose adhesive strength is measured.

Compositions where the amount of hemicellulose-cleavage products is up to 80% by weight, preferably up to about 70% by weight, generally still have excellent application properties and an adhesive strength which fully satisfies the technical requirements. The lower limit for the hemicellulose-cleavage products content is preferably 25% by weight. As a result, the amount of phenolic resins and the like can be considerably reduced.

The average degree of polymerization, DP, is advisably at least 10, preferably at least 15. The upper limit is advisably 70, preferably 30.

For the purpose of the present invention, hemicellulose-cleavage products are products which are obtained by the partial decomposition of hemicelluloses. Preferable compositions thus contain hemicellulose-cleavage products in the form of aqueous solutions which have been obtained by thermally decomposing vegetable, hemicellulose-containing raw materials and separating the fibrous materials from the aqueous cooking liquor. As to methods of preparing such solutions, reference is made, by way of example, to the patents which will be mentioned below.

Hemicelluloses, as constituents of cell walls, are widely distributed in the plant kingdom. Second only to cellulose, these polysaccharides are the most frequently occurring organic natural materials on earth. Hemicelluloses include xylans, the linear main chains of which are composed of xylose radicals, and glucomannans, the main chains of which consists of mannose and glucose radicals. Some workers count among hemicelluloses also pectins or pectin-like materials whose branched macromolecules are essentially made up of arabinose, glactose and galacturonic acid radicals.

The O-acetyl-4-0-methylglucuronoxylans of hardwoods are highly acetylated, and they contain 4-0-methylglucuronic acid radicals as side chains; their content in the wood amounts to 10-35%. The arabino-4-0-methylglucuronoxylans of softwoods have a higher 4-0-methylglucuronic acid content and also have arabino radicals as side chains. Softwood contains between 8 and 12% of these xylans.

Arabino-4-0-methylglucuronoxylans which usually have a relatively low 4-0-methylglucuronic acid content and a relatively high arabinose content can be found in highly fluctuating, occasionally very large amounts in many annual plants.

The glucomannans content in hardwoods is, at about 3 to 5%, low. In contrast, the galactoglucomannans of softwoods, which contain various amounts of galactose radicals as side chains, occur in amounts of 15-25% in the wood. The glucomannans content in annual plants is again highly fluctuating.

Xylans and mannans of hardwoods and softwoods have average degrees of polymerization (DP) of between 100 and 200. In annual plants, the average DP values for xylans are in the same range, while for mannans they are, in some cases, below 100 but in others significantly above 200. Pectins and pectin-like substances have very different DP values but which are generally higher than those of xylans or mannans. However, compared with xylans and mannans, they are readily cleaved by hydrolysis, and for this reason the DP frequently significantly decreases in the course of the isolation of these materials from the vegetable raw materials.

Hemicellulose-cleavage products as defined in the present invention are thus available in large amounts from vegetable materials. Methods of preparing such hemicellulose-cleavage products are described, for example, in German Auslegeschriften No. 2,732,327 (steam/pressure method) and No. 2,737,118 (Organosolv method).

These methods can produce not only largely pure hemicellulose-cleavage products but also mixtures of hemicelluloses and decomposition products of aromatic polymers, especially lignins and tannins, namely in the steam/pressure extraction described in German Auslegeschrift No. 2,732,327 by extracting the steam-cooked pulp with alkali, and in the Organosolv method of German Auslegeschrift No. 2,737,118 provided the carbohydrates do not separate from the lignins in the cooking liquors. The abovementioned xylan-cleavage products and the aromatics obtained at the same time in the methods mentioned are of particularly great economic importance, because they can be obtained in huge amounts from various vegetable raw materials, for example hardwoods and annuals. These raw materials are available in large amounts all over the earth, and they continuously renew themselves.

The upper DP limit defined above is important since the high molecular weight carbohydrates give colloidal, highly viscous solutions which usually have pseudoplastic flow and which hinder the preparation of heat-curable compositions according to the invention. For example, the molecular weight of freshly extracted pectins can on average be about 100,000 (W. Pilnik et al. Ullmann, Volume 19, pages 233-263).

The lower DP limit defined above is important, since low-oligomeric and, especially, monomeric cleavage products, for example xylose in the case of xylan-cleavage products, have an adverse effect on the properties of the heat-curable compositions. However, we found, surprisingly, that, given a sufficient DP, the presence of monomeric cleavage products and of other low molecular weight impurities does not interfere.

The aldehydes are preferably in an amount of 20% by weight, but at least 5% by weight, relative to the weight of the hemicellulose-cleavage products. The amount of aldehydes is preferably at most about 40, but particularly preferably at most 35% by weight. For the purposes of the invention, aldehyde is particularly preferably formaldehyde or paraformaldehyde, since it is readily accessible and inexpensive, which also applies to the prior art condensation products defined above. Furfuraldehyde is suitable, since, as is well-known, it can be obtained from agricultural and forestry waste products, such as oat husks, maize cobs, rice husks, peanut shells and wood, which fact is of great significance to some countries in view of the independence from crude oil.

The alkali used is preferably sodium hydroxide. However, it is also possible to use, for example, potassium hydroxide and/or ammonia and/or amines. The amount of alkali is advantageously up to 20% by weight, relative to the curable materials.

The defined compositions have particularly favorable properties. The solutions which contain hemicellulose-cleavage products and aromatics and which are used in preparing the compositions according to the invention are obtained remarkably easily and without the addition of toxic chemicals (cf. German Auslegeschrift No. 2,732,327). They are based on raw materials which continuously regrow. In particular, however, sizable amounts of toxic chemicals which are customarily used in preparing such compositions are replaced by natural materials which are not based on crude oil, which is becoming increasingly scarce.

The glues according to the invention surprisingly have tack which is still better than that of the pure condensation products and which is particularly favorable for certain transport systems in the manufacture of wooden materials. A significant advantage of heat-curable compositions according to the invention over phenolic resins is their color. Phenolic resins have a dark brown color. For visual reasons, therefore, they frequently cannot be used; the dark color is troublesome, for example, in the glueing of light-colored woods. The compositions according to the invention have a yellowish to pale brown shade. For this reason, the glued joints can hardly be seen even in the case of light-colored woods, and in the case of thin veneers, the much-feared dark strike through of the glue through the pores of the wood, which phenomenon is familiar with customary phenolic resins, cannot arise.

EXAMPLE 1

Wheatstraw was cooked at 180° C. for 20 minutes in a steam/pressure process pilot plant with a throughput of about 350 kg/h, and fibrillated, and the resulting pulp was washed with hot water. This treatment dissolved 23.4% of the components of the wood. 9.3% were carbohydrates and 5.7% xylans and xylan-cleavage products (all relative to absolutely dry starting material). The noncarbohydrates content consists of ingredients, lignin fragments, acetic acid and carbohydrate-decomposition products. The solution was concentrated in a vacuum rotary evaporator up to a solids content of the dissolved wood components of 66% by weight=solution A. Solution B was a commercially available alkaline phenolic resin (Kauresin 240, BASF, registered trademark) having a solids content of 48% by weight. These solutions were used to prepare several glueing liquors in a weight ratio of A to B of 75:25, 50:50 and 25:75. 100 g of glueing liquor thus contained 49.5 g of extract, 12 g of phenolic resin and 38.5 g of water, or 33 g of extract, 24 g of phenolic resin and 43 g of water, or 16 g of extract, 36 g of phenolic resin and 47.5 g of water. 5 g of coconut shell powder (MS 300), as filler, and 5 g of paraformaldehyde, as curing agent, were added per 100 g of each glueing liquor. The thoroughly mixed glueing liquors were applied to 5 mm thick beech plates (equilibrium moisture content 12% after conditioning at 20° C. in 65% relative humidity). The glue was applied at a rate of 200 g/m². A pressure of 0.98 N/mm² was used in preliminary pressing. The plates were then pressed at a hot-plate temperature of 150° C. for 10 minutes with 1.47 N/mm².

The glueing was in accordance with DIN 53,254, and the glueings were tested in accordance with test groups $B_1$ and $B_4$ of DIN 68,602. The results are shown below.

TABLE 1

| Example 1 | Mixing ratio | | Adhesive strength | |
|---|---|---|---|---|
| | Solution A | Solution B | after conditioning N/mm² | after 6 hour boil N/mm² |
| a | 75 | 25 | 11.7 | 4.5 |
| b | 50 | 50 | 13.9 | 5.4 |
| c | 25 | 75 | 17.1 | 9.0 |
| Minimum requirements of DIN 68,602 | | | 10.0 | 4.0 |

The adhesive strength values which are above 10 and 4 N/mm² respectively generally reflect the strength values of the particular wood, which differ more or less according to the direction of cut, grain and the like. For this reason, all strength values which are above 10 or 4 N/mm² respectively should be considered equally good.

EXAMPLE 2

Birchwood was cooked at 187° C. for 30 minutes using the steam/pressure method, and fibrillated, and the resulting fibrous substance was washed with hot water. This treatment dissolved 31% of the wood components. 14.3% were carbohydrates, while 11.2% were xylans and xylan-cleavage products (all relative to absolutely dry starting material). The solution was concentrated up to a solids content of the dissolved wood components of 58.1% by weight. Sodium hydroxide was added to adjust the solution to a 10% by weight alkali content=solution A. Solution B was a commercially available phenolic resin (Kauresin) 260, BASF, registered trademark) having a solids content of 48% by weight.

These solutions were used to prepare several glueing liquors having the mixing ratios (weights of the solution) given in Table 2. Solution B was used as comparative solution.

10 g of coconut shell powder (MS 300), as filler, and 10 g of paraformaldehyde, as curing agent, were added per 100 g of each glueing liquor. The thoroughly mixed glueing liquors were applied as described in Example 1 to 5 mm thick beech plates, and the preliminary pressing and the test were also carried out as in Example 1.

The results are shown below.

TABLE 2

| Example 2 | Mixing ratio | | Adhesive strength | |
|---|---|---|---|---|
| | Solution A | Solution B | after conditioning N/mm² | after 6 hour boil N/mm² |
| a | 70 | 30 | 16.0 | 7.1 |
| b | 50 | 50 | 12.6 | 5.9 |
| c | 0 | 100 | 12.2 | 7.1 |
| Minimum requirements of DIN 68,602 | | | 10.0 | 4.0 |

EXAMPLE 3

The following were each dissolved in 100 g of a 10% strength aqueous sodium hydroxide solution:

$A_1$: 100 g of xylose
$A_2$: 5 g of xylan and 95 g of xylose
$A_3$: 10 g of xylan and 90 g of xylose
$A_4$: 20 g of xylan and 80 g of xylose
$A_5$: 30 g of xylan and 70 g of xylose
$A_6$: 40 g of xylan and 60 g of xylose The xylan was a preparation obtained from red beechwood as described by M. Sinner, H. H. Dietrichs and M. H. Simatupang in Holzforschung 26 (1972) 218-228. The solutions $A_1$ to $A_5$ were each admixed with 60 g of a commercially available phenolic resin having a solids content of 48%, 10 g of coconut shell powder (MD 300) and 10 g of paraformaldehyde. The glueing and subsequent testing were carried out as described in Example 1. The results are shown below.

TABLE 3

| Mixing ratio | | Adhesive strength after conditioning |
|---|---|---|
| Xylan | Xylose | N/mm$^2$ |
| 0 | 100 | 4.4 |
| 5 | 95 | 6.6 |
| 10 | 90 | 7.9 |
| 20 | 80 | 8.7 |
| 30 | 70 | 9.6 |
| 40 | 60 | 11.4 |

The minimum requirement according to DIN 68,802 for the dry adhesive strength is 10 N/mm$^2$.

The adhesive strength results clearly show that they increase with increasing xylan content, or with increasing DP, or, in other words, the xylose, as is known from other sugars, interferes with the glueing. For example, it has been described in the literature that 7% of sucrose at most can be added to alkaline phenolic resins without adversely affecting the adhesive strength of glueings (C. D. Chang and O. K. Kononenko, Adhesives Age, 1962, 36–40). On the other hand, in the direct condensation of phenol, formaldehyde and sucrose, up to 50% of the phenol can be replaced by sucrose, since in this case the sucrose in the glued joint is no longer present as a monomer but in a chemically bonded form.

EXAMPLE 4

The extract described in Example 1 of wheatstraw treated with steam/pressure was used as solution A. Solution B was a phenolic resin (Kauresin 260, BASF, registered trademark) having a solids content of 48%.

50 g of each solution were mixed, and 5 g of coconut shell powder, as filler, 5 g of paraformaldehyde as curing agent, and 5 g of polyvinyl acetate (Mowilith powder D, Hoechst, registered trademark), as film-forming substance, were added. The glueing and subsequent testing were carried as described in Example 1, except that the pressing temperature was in this case 130° C. The adhesive strength after conditioning was 10.7 N/mm$^2$ and after a 6 hour boil 4.6 N/mm$^2$.

EXAMPLE 5

The glueing liquor used was the solution described in Example 4. 5 g of coconut shell powder, as filler, and 5 g of epichlorohydrin, as curing agent, were added to 100 g of glueing liquor.

The adhesive strength after conditioning was 11.0 N/mm$^2$ and after a 6 hour boil 5.2 N/mm$^2$.

EXAMPLE 6

The extract described in Example 1 of wheatstraw treated with steam/pressure was used as solution A. 80 g of solution A and 20 g of pure melamine were thoroughly mixed, and 5 g of paraformaldehyde, as curing agent, and 5 g of coconut shell powder, as filler, were added. The glueing and subsequent testing were carried out as described in Example 4.

The adhesive strength after conditioning was 11.4 N/mm$^2$ and after a 6 hour boil 5.6 N/mm$^2$.

EXAMPLE 7

Birchwood was cooked at 185° C. for 20 minutes in a steam/pressure method pilot plant using a throughput of 240 kg/h, and fibrillated, and the resulting fibrous substance was washed with hot water.

This treatment dissolved 12.6% of the wood components, of which 7.6% were carbohydrates, while 5.3% were xylan and xylan-cleavage products (all relative to absolutely dry starting material). The solution was freeze-dried. Freeze-dried material was stirred into a 10% strength aqueous sodium hydroxide solution in such an amount that a 60% strength solution was obtained = solution A. Solution B was a commercially available alkaline phenolic resin (Kauresin 260, BASF, registered trademark).

These solutions were used to prepare a glueing liquor in a weight ratio of A to B of 50:50. 5 g of coconut shell powder, as filler, and 10 g of furfuraldehyde, as curing agent, were added to this glueing liquor. The glueing and tests were carried out as described in Example 1. The adhesive strength after conditioning was 10.8 N/mm$^2$ and after a 6 hour boil 4.2 N/mm$^2$.

EXAMPLE 8

Birchwood (1443 g calculated as absolutely dry) were cooked at 187° C. for 40 minutes by means of the steam/pressure method, and fibrillated, and the resulting fibrous substance was suspended in 38 liter of 0.4% strength aqueous NaOH at room temperature, and separated from the alkaline extract by filtering the suspension and pressing the filter residue. After pressing, the yield of fibrous substance was 47.8% relative to starting wood (absolutely dry). The solution was concentrated in vacuo at 55° C. up to a solids content of 41% = solution A.

Solution B was a phenolic resin (Kauresin 260, registered trademark) having a solids content of 48%. 5 g of coconut shell powder, as filler, and 5 g of paraformaldehyde, as curing agent, were added to 100 g of glueing liquor.

The glueing and subsequent testing were carried out as described in Example 1. The results are shown below.

TABLE 4

| Mixing ratio | | Adhesive strength | |
|---|---|---|---|
| | | after conditioning | after 6 hour boil |
| Solution A | Solution B | N/mm$^2$ | N/mm$^2$ |
| 75 | 25 | 10.2 | 4.4 |
| 50 | 50 | 12.4 | 4.3 |

EXAMPLE 9

Birchwood was cooked at 187° C. for 20 minutes using the steam/pressure method, and fibrillated, and the fibrous substance was washed with hot water; 28% of the wood components dissolved. The carbohydrate content was 60%. The solution was freeze-dried. The freeze-dried extract was used to prepare a 5% strength solution which was ultrafiltered in an ultrafiltration apparatus supplied by Amicon, Lexington, 14.5% of the solution passing through the ultrafilter and 85.5% being retained.

Ultrafiltrate, supernatant and original solutions were each concentrated up to a solids content of 55%. The ultrafiltrate solution = solution A, supernatant solution = solution B, original solution = solution C and the phenolic resin (Kauresin 260, registered trademark) = solution D, were used to prepare glueing liquors in a weight ratio of A to D of 75:25, B to D of 75:25 and C to D of 75:25.

10 g of coconut shell powder (MS 300), as filler, and 10 g of paraformaldehyde, as curing agent, were added to each 100 g of each glueing liquor. The glueing and subsequent testing were carried out as in Example 1. The results are shown below.

TABLE 5

| Mixing ratio | | | | Adhesive strength | |
|---|---|---|---|---|---|
| Solution A | Solution B | Solution C | Solution D | after conditioning N/mm$^2$ | after 6 hour boil N/mm$^2$ |
| 75 | — | — | 25 | 0 | 0 |
| — | 75 | — | 25 | 11.9 | 4.1 |
| — | — | 75 | 25 | 12.7 | 4.0 |

As can be seen from the results, it is evident that only low molecular weight wood components lead to an unsuccessful glueing. However, the low molecular weight components contained in the total extract have no significant adverse effect on the glueing, provided they are glued together with the high molecular weight components.

EXAMPLE 10

Birchwood (582.9 g of absolutely dry) was cooked at 187° C. for 20 minutes using the steam/pressure method, and fibrillated, and the resulting fibrous substance was suspended in 9.5 liter of 0.4% strength aqueous NaOH at room temperature, and separated from the alkaline extract by filtration and pressing the filter residue. After pressing, the yield of fibrous substance was 49.5%, relative to starting wood (absolutely dry). The solution was concentrated in vacuo at 55° C. up to a solids content of 41.3% by weight=solution A. Solution B was a phenolic resin (Kauresin 240, BASF, registered trademark) having a solids content of 48%. 5 g of coconut shell powder, as filler, and 5 g of paraformaldehyde, as curing agent, were added to 100 g of glueing liquor. The glueing and subsequent testing were carried out as described in Example 1. The results are shown below.

TABLE 6

| Mixing ratio | | Adhesive strength | |
|---|---|---|---|
| Solution A | Solution B | after conditioning N/mm$^2$ | after 6 hour boil N/mm$^2$ |
| 75 | 25 | 10.4 | 4.0 |

EXAMPLE 11

Birchwood (629.0 g of absolutely dry) was cooked at 187° C. for 20 minutes using the steam/pressure method, and fibrillated, and the resulting fibrous substance was washed with hot water. 23% of the wood components dissolved. The fibrous substance was separated from the aqueous extract by filtering with suction. The resulting fibrous substance was suspended in 11.4 liters of 0.4% strength aqueous NaOH at room temperature and separated from the alkaline extract by filtration and pressing the filter residue. After pressing, the yield of fibrous substance was 46%, relative to the starting wood (absolutely dry). The alkaline solution was concentrated in vacuo at 55° C. up to a solids content of 60%=solution A. Solution B was a phenolic resin (Kauresin 240, BASF, registered trademark) having a solids content of 48%. 5 g of coconut shell powder, as filler, and 5 g of paraformaldehyde, as curing agent, were added to 100 g of glueing liquor. The glueing and subsequent testing were carried out as described in Example 1. The results are shown below.

TABLE 7

| Mixing ratio | | Adhesive strength | |
|---|---|---|---|
| Solution A | Solution B | after conditioning N/mm$^2$ | after 6 hour boil N/mm$^2$ |
| 75 | 25 | 10.6 | 4.5 |
| 50 | 50 | 11.6 | 4.3 |

EXAMPLE 12

Chain length distribution of extracted xylans

Wheatstraw was steam/pressure-treated at 180° C. for 20 minutes, and extracted with water. The aqueous extract was freeze-dried.

0.9 mg of a freeze-dried material dissolved in 0.18 ml of water were used to analyze the chain length distribution by gel chromatography. The most important details of the method used are collated in the following table:

| | |
|---|---|
| Stationary phase: | Biogel (registered trademark) P 4 200–400 mesh |
| Mobile phase: | McIllvaine (Na$_2$HPO$_4$/citric acid) buffer pH 7.8 |
| Column diameter: | 1.5 cm |
| Column Length: | 96 cm |
| Elution rate: | 0.36 ml/min |
| Temperature: | 30° C. |

The sugars were detected in the eluate with a Technicon instrument (registered trademark) using 0.1% of orcin in 70% of H$_2$SO$_4$. The column eluate (0.36 ml) was combined with air (0.36 ml) and detection reagent (1.25 ml) and incubated at 95° C. The extinction was measured at 420 nm in a 10 mm long flow-through cuvette.

The xylo-oligomers up to a degree of polymerization of 10 can be clearly distinguished in the chromatogram. Since the gel used has an exclusion volume of molecular weight 4000, it follows that the detected xylan fragments in the exclusion volume have a degree of polymerization of about 26 or higher.

What we claim is:

1. An aqueous heat-curable admixture consisting essentially of
   (a) an unreacted water-soluble hemicellulose-cleavage product having an average degree of polymerization of 5 to 100 in an amount of at least 10% by weight, relative to the total weight of heat-curable materials comprising said composition,
   (b) at least one aldehyde in an amount of 5 to 50% by weight, relative to the weight of the hemicellulose-cleavage products, and
   (c) at least one heat-curable condensation product of an aldehyde and an —OH and/or —NH$_2$ containing compound.

2. An admixture as claimed in claim 1, wherein said hemicellulose-cleavage product comprises a xylan-cleavage product.

3. A composition as claimed in claim 1, wherein said hemicellulose-cleavage product comprises a mannan-cleavage product.

4. An admixture as claimed in claim 1, wherein said average degree of polymerization is at least 10.

5. An admixture as claimed in claim 1, wherein said average degree of polymerization is at most 70.

6. An admixture as claimed in claim 1, wherein said hemicellulose-cleavage product is present in an amount of at least 25% by weight, relative to the total weight of heat-curable materials.

7. An admixture as claimed in claim 1, wherein said hemicellulose-cleavage product is present in an amount of at most 90% by weight.

8. An admixture as claimed in claim 1, wherein said hemicellulose-cleavage product was obtained by thermally decomposing vegetable, hemicellulose-containing raw materials under pressure in the presence of steam.

9. An admixture as claimed in claim 8, wherein fibrous substances are removed after said decomposing of said raw materials.

10. An admixture as claimed in claim 1, wherein said aldehyde is selected from the group consisting of formaldehyde, paraformaldehyde and furfuraldehyde.

11. An admixture as claimed in claim 10, wherein said aldehyde is present in an amount of less than 20% by weight, but at least 5% by weight, relative to the weight of the hemicellulose-cleavage product.

12. An admixture as claimed in claims 10 or 11, wherein said aldehyde is present in an amount of at most about 40% by weight, relative to the weight of the hemicellulose-cleavage product.

13. An admixture as claimed in claim 1, which additionally contains alkali in an amount of up to 20% by weight, relative to said heat-curable materials.

14. An improved adhesive composition comprising an effective amount of the aqueous heat-curable admixture as claimed in claim 1 and a resin.

15. An improved impregnating composition for cellulosic webs comprising the aqueous heat-curable admixture as claimed in claim 1 and an impregnating medium.

16. An improved molding composition comprising the aqueous heat-curable admixture as claimed in claim 1 and a molding medium.

17. An admixture as claimed in claim 4, wherein said average degree of polymerization is at least 15.

18. An admixture as claimed in claim 5, wherein said average degree of polymerization is at most 30.

19. An admixture as claimed in claim 12, wherein said aldehyde is present in an amount of at least 35% by weight, relative to said heat-curable materials.

* * * * *